United States Patent
Liu et al.

(10) Patent No.: US 9,323,908 B2
(45) Date of Patent: Apr. 26, 2016

(54) AUTHENTICATION METHOD AND ELECTRONIC DEVICE

(75) Inventors: Yongfeng Liu, Beijing (CN); Jiangtao Shen, Beijing (CN); Jun Li, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 31 days.

(21) Appl. No.: 13/976,283

(22) PCT Filed: Dec. 22, 2011

(86) PCT No.: PCT/CN2011/084428
§ 371 (c)(1),
(2), (4) Date: Jun. 26, 2013

(87) PCT Pub. No.: WO2012/089057
PCT Pub. Date: Jul. 5, 2012

(65) Prior Publication Data
US 2013/0283349 A1  Oct. 24, 2013

(30) Foreign Application Priority Data
Dec. 31, 2010  (CN) .......................... 2010 1 0618401

(51) Int. Cl.
*G06F 21/30* (2013.01)
*G06F 21/44* (2013.01)
(52) U.S. Cl.
CPC ................ *G06F 21/30* (2013.01); *G06F 21/44* (2013.01)
(58) Field of Classification Search
CPC combination set(s) only.
See application file for complete search history.

(56) References Cited

U.S. PATENT DOCUMENTS

2009/0254762 A1* 10/2009 Priel et al. ...................... 713/193
2010/0332854 A1* 12/2010 Ishii ............................... 713/193

FOREIGN PATENT DOCUMENTS

CN    101131720 A    2/2008
CN    101261668 A    9/2008
(Continued)

OTHER PUBLICATIONS

International Search Report and Written Opinion for PCT Application No. PCT/CN2011/084428, dated Mar. 22, 2012, 8 pages.
(Continued)

*Primary Examiner* — Beemnet Dada
(74) *Attorney, Agent, or Firm* — Westman, Champlin & Koehler, P.A.

(57) ABSTRACT

Embodiments of the present disclosure provide an authentication method and an electronic device. The method includes: generating by a first device an authentication request if a predetermined condition exists between the first device and a second device, when the first device is in a locking state, wherein the first device has the locking state and a non-locking state; receiving by the first device authentication information, the authentication information being input in response to the authentication request; and authenticating the second device using the authentication information. Through the present disclosure, others cannot directly damage or copy data in the first device in a connection manner such as using a data line even if they get hold of the device, as long as the first device is in the locking state. Thus, the security of the data in the first device is ensured. Since a complex synchronization authentication protocol does not need to be developed by synchronization software and the first device, and the present disclosure is compatible with various commercially available synchronization software, the implementation method is simple and efficient, and the compatibility is good.

13 Claims, 3 Drawing Sheets

(56) References Cited

FOREIGN PATENT DOCUMENTS

| CN | 101635921 A | 1/2010 |
|---|---|---|
| CN | 101796525 A | 8/2010 |
| CN | 101930409 A | 12/2010 |
| TW | 201037596 A1 | 10/2010 |

OTHER PUBLICATIONS

First Chinese Office Action for Chinese Patent Application No. 201010618401.5, dated Dec. 26, 2013, 13 pages.

* cited by examiner

AUTHENTICATION METHOD AND ELECTRONIC DEVICE

CROSS-REFERENCE TO RELATED APPLICATION

This Application is a Section 371 National Stage Application of International Application No. PCT/CN2011/084428, filed 22 Dec. 2011 and published as WO 2012/089057 A1 on 5 Jul. 2012, in English, the contents of which are hereby incorporated by reference in their entirety.

TECHNICAL FIELD

The present disclosure relates to a field of data security, and more particularly, to authentication methods and electronic devices.

BACKGROUND

Current mobile devices generally support a storage mode and a synchronization mode by a USB interface. The synchronization mode includes synchronization of an address book, a calendar, an email, a message and an application etc. with other devices. When data operations of the synchronization mode or the storage mode need to be performed, data in the mobile device may be operated just when the mobile device is connected to other devices. Therefore, there is a great security threat, and security of data in the mobile device cannot be guaranteed. For example, in a case that the device of the user is lost or the user leaves temporarily, others may damage or copy the data in the mobile device directly via the USB data line as long as they get hold of the device, even if the user sets a screen locking password.

Therefore, it is desired to solve a problem of how to maintain security of the data in the mobile device.

SUMMARY

Embodiments of the present disclosure provide authentication methods and electronic devices, so as to guarantee security of data in the device.

Embodiments of the present disclosure provide an authentication method, including: generating by a first device an authentication request if a predetermined condition exists between the first device and a second device, when the first device is in a locking state, wherein the first device has the locking state and a non-locking state; receiving by the first device authentication information, the authentication information being input in response to the authentication request; and authenticating the second device using the authentication information.

The predetermined condition is the first device being connected to the second device; or the predetermined condition is the first device being connected to the second device and the first device receiving a request for data read and/or write from the second device.

When the authentication is passed, the method further includes: the first device receiving a request for data read and/or write from the second device, and allowing a data read and/or write operation of the second device on the first device.

When the authentication is not passed, the method further includes: the first device receiving a request for data read and/or write from the second device, and forbidding a data read and/or write operation of the second device on the first device.

The locking state includes a state in which the first device executes a command in a first set of commands; the non-locking state includes a state in which the first device executes a command in a second set of commands, wherein the number of commands in the first set of commands is less than that in the second set of commands; the first set of commands include an unlocking command which is invoked for switching from the locking state to the non-locking state after an unlocking authentication is passed.

The authentication request generated by the first device is set for a data read and/or write operation of the second device on the first device, or is an unlocking authentication request.

Embodiments of the present disclosure provide a first device having a locking state and a non-locking state. The first device includes a processor configured for: generating an authentication request if a predetermined condition exists between the first device and a second device, when the first device is in a locking state; receiving authentication information, the authentication information being input in response to the authentication request; and authenticating the second device using the authentication information.

The predetermined condition is the first device being connected to the second device; or the predetermined condition is the first device being connected to the second device and the first device receiving a request for data read and/or write from the second device.

The processor is further configured for allowing a data read and/or write operation of the second device on the first device, when the first device receives a request for data read and/or write from the second device after the second device is authenticated.

The locking state includes a state in which the first device executes a command in a first set of commands; the non-locking state includes a state in which the first device executes a command in a second set of commands, wherein the number of commands in the first set of commands is less than that in the second set of commands; the first set of commands include an unlocking command which is invoked for switching from the locking state to the non-locking state after an unlocking authentication is passed.

The authentication request is set for a data read and/or write operation of the second device on the first device, or is an unlocking authentication request.

Embodiments of the present disclosure provide an electronic device having a locking state and a non-locking state, comprising: a connection unit configured for connecting to another device; an authentication unit configured for generating an authentication request when the electronic device is in the locking state and is connected to the other device via the connection unit, and a predetermined condition is met; receiving authentication information being input in response to the authentication request; and authenticating the other device using the authentication information.

The electronic device further includes: a storage unit configured for storing data; wherein a read and/or write operation of the other device on the data stored in the storage unit is allowed, when the other device is authenticated.

According to embodiments of the present disclosure, others cannot directly damage or copy data in the first device in a connection manner such as using a USB data line even if they get hold of the device, as long as the first device is in the locking state. Thus, the security of the data in the first device is ensured. Since a complex synchronization authentication protocol does not need to be developed by synchronization software and the first device, and the present disclosure is compatible with various commercially available synchronization software, the implementation method is simple and efficient, and the compatibility is good.

DETAILED DESCRIPTION OF PREFERRED EMBODIMENTS

Technical solutions of the embodiments of the present disclosure will be described clearly and thoroughly with reference to the drawings in the embodiments of the present disclosure. Apparently, the embodiments as described are only parts of the embodiments of the present disclosure. The skilled in the art may contemplate other variations or modifications based on the embodiments of the present disclosure, which fall within the protection scope of the present disclosure.

Figure 1:
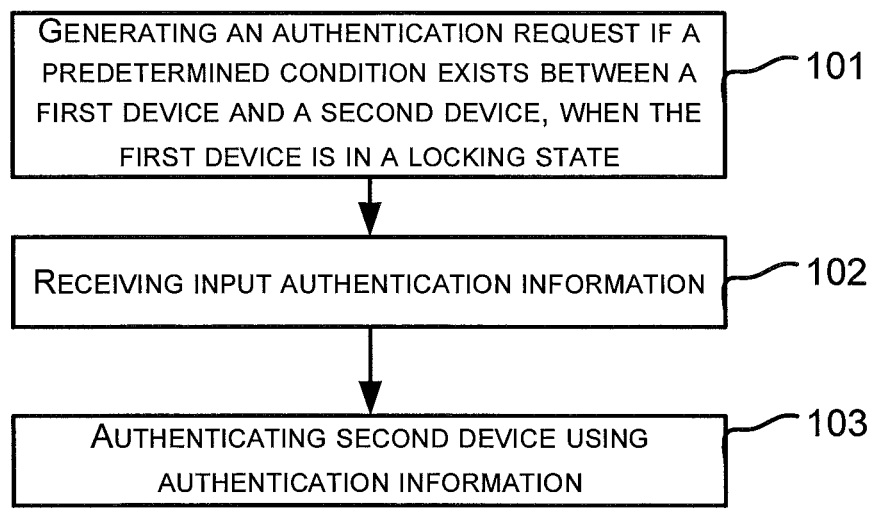
FIG. 1 is a flow chart of an authentication method according to an embodiment of the present disclosure.

Referring to FIG. 1 which shows a flow chart of an authentication method according to an embodiment of the present disclosure, the authentication method of the present embodiment may be applied to a first device. The first device may have a locking state and a non-locking state. The authentication method includes steps as follows.

In Step 101, an authentication request is generated by the first device if a predetermined condition exists between the first device and a second device, when the first device is in a locking state.

The predetermined condition is the first device being connected to the second device. Such a connection may be a wired connection or a wireless connection.

Or, the predetermined condition is the first device being connected to the second device and the first device receiving a request for data read and/or write from the second device. In this case, when the first device is connected to the second device, the first device does not generate the authentication request immediately, but generates the authentication request only after the first device receives the request for data read and/or write from the second device.

The authentication request may be used for prompting the user of inputting the authentication information. For example, the authentication request may prompt the user of inputting the authentication information to the first device.

In Step 102, the first device may receive the authentication information, the authentication information being input in response to the authentication request.

The authentication information may include a predetermined string or a predetermined touch trail or a predetermined biological characteristic etc. The embodiment of the present disclosure does not limit particular presentation forms of the authentication information.

In Step 103, the second device may be authenticated using the authentication information.

For example, the authentication information received from the user may be compared with pre-stored information. If matched, the authentication is passed; otherwise, the authentication is not passed.

It should be noted that after the authentication of the second device is passed, the method as shown in FIG. 1 may further include: the first device receiving a request for data read and/or write from the second device, and forbidding a data read and/or write operation of the second device on the first device.

It should be noted that the locking state includes a state in which the first device executes a command in a first set of commands; the non-locking state includes a state in which the first device executes a command in a second set of commands, wherein the number of commands in the first set of commands is less than that in the second set of commands.

The commands in the first set of commands may include a communication prompt command such as a prompt of an incoming call, a SMS etc. a timed reminder command such as a prompt of a clock, a memo etc., and an unlocking authentication, an unlocking command etc. When the first device is in the locking state, the unlocking command may be executed for switching the first device from the locking state to the non-locking state.

The commands in the second set of commands may include commands related to almost all the functions of the first device, such as calling, accessing local data, accessing a local network, communication prompt, a timed reminder etc. Thus, the number of commands in the second set of commands is more than that in the first set of commands.

It should be noted that when the first device is in the locking state, an unlocking authentication request may be generated, and unlocking authentication information may be received. If the unlocking authentication is passed, the unlocking command may be invoked. The unlocking authentication may be authentication of the predetermined string, or the predetermined touch trail or the predetermined biological characteristic etc. That is, the unlocking authentication request may prompt the user of inputting the unlocking authentication information, and the unlocking command may switch the first device from the locking state to the non-locking state.

It should be noted that the authentication request generated by the first device is an authentication request set for the data read and/or write operation of the second device on the first device, or the authentication request generated by the first device is the unlocking authentication request. In this case, the first device may be enabled to enter the non-locking state by inputting the unlocking authentication information. Then, the second device may be allowed to perform the data read and/or write operation on the first device by inputting the authentication information for the data read and/or write operation.

It should be noted that the first device may be an electronic device such as a mobile terminal, a computer etc.; and the second device may be an electronic device such as a mobile terminal, a computer etc. Here, the particular presentation forms of the first and the second devices are not limited as long as the first and the second devices may be connected wiredly (e.g. by a USB, am Ethernet cable) or wirelessly (e.g. by Bluetooth, WIFI (Wireless Fidelity)) for transferring data.

According to embodiments of the present disclosure, others cannot directly damage or copy data in the first device in a connection manner such as using a USB data line even if they get hold of the device, as long as the first device is in the locking state. Thus, the security of the data in the first device is ensured. Since a complex synchronization authentication protocol does not need to be developed by synchronization software and the first device, and the present disclosure is compatible with various commercially available synchronization software, the implementation method is simple and efficient, and the compatibility is good.

Hereinafter, the present disclosure will be further described in detail with reference to the drawings and particular embodiments.

Figure 2:
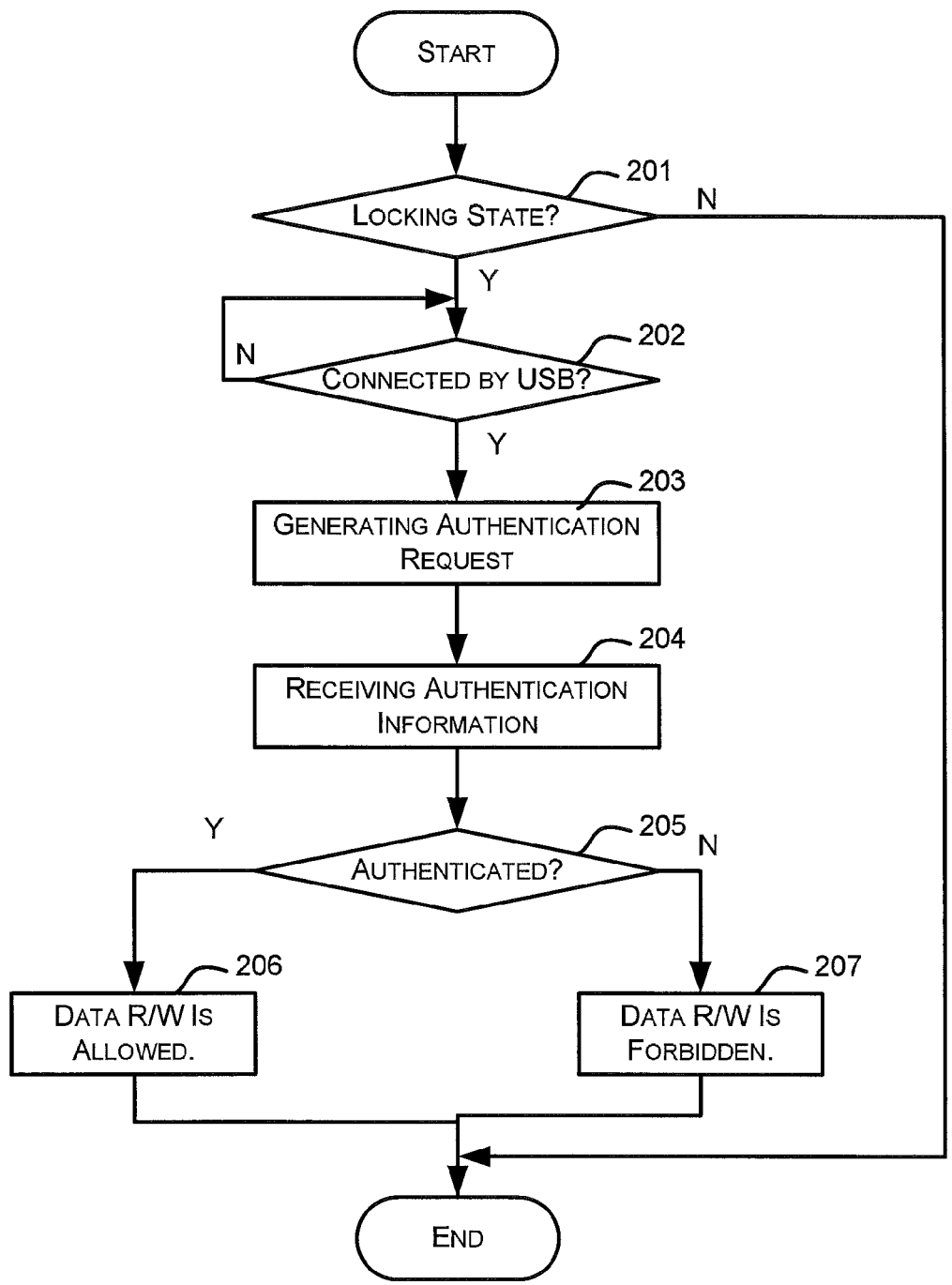
FIG. 2 is a flow chart of an authentication method according to another embodiment of the present disclosure.

Referring to FIG. 2, FIG. 2 shows a flow chart of the embodiment of the present disclosure, In the embodiment, assuming the first device is the mobile terminal having the locking state and the non-locking state, the second device is a computer, and the mobile terminal is connected to the computer via the USB, the flow chart may include: Step 201 of determining whether the mobile device is in the locking state. If so, the process continues to Step 202; otherwise, the process ends.

The locking state is a state in which the mobile terminal executes the command in the first set of commands. The non-locking state is a state in which the mobile device executes the command in the second set of commands, wherein the number of commands in the first set of commands is less than that in the second set of commands. When the mobile device is in the locking state, the mobile device may be switched to the non-locking state by the unlocking command in the first set of commands. For example, under the locking state, the locking state may be unlocked by inputting the authentication information such as password to invoke the unlocking command.

In one embodiment, the first set of commands may include the unlocking command only, and the second set of commands may include a plurality of commands such as reading the address book, SMSs, synchronizing data, sending SMSs, charging the mobile terminal etc. In another embodiment, the first set of commands may include the unlocking command and the command of charging the mobile terminal.

It should be noted that the unlocking command may be unlocked by the password, and fingerprint, iris etc.

Step 202 of determining whether the mobile device is connected to the computer by the USB connection. If so, the process continues to Step 203; otherwise, the step may be repeated.

Here, when the mobile device is connected to the computer by the USB connection, it may be considered that there is a predetermined condition between the mobile device and the computer.

It should be noted that there is no strict sequential order between Steps 201 and 202. The order of the two steps may be varied.

Step 203 of generating the authentication request by the mobile device.

Here, the authentication request may be set dedicated for performing the data read and/or write operation on the mobile device by the computer, and may also be the unlocking command in the first set of commands.

Step 204 of receiving the authentication information input in response to the authentication request.

Step 205 of authenticating using the authentication information and determining whether the authentication is passed. If so, the process continues to Step 206; otherwise, the process continues to Step 207.

Step 206 of allowing the data read and/or write operation of the computer on the mobile device, when the mobile device receives the data read and/or write request from the computer.

Step 207 of forbidding the data read and/or write operation of the computer on the mobile device, when the mobile device receives the data read and/or write request from the computer. Alternatively, Step 207 may only support a charging command.

The security of the data in the mobile terminal device may be guaranteed by authentication of the computer.

In a case that the mobile device is locked, a system core layer may capture a connection break of the USB data line, notify an application layer, and pop-up a USB mode selection window for the user to select a mode. The modes available for selection may be a storage mode or a data synchronization mode. Before a mode is selected, the USB driver may only support the charging mode. When the user selects one of the two modes, an authentication window may be triggered. The authentication window may be particularly designed for authentication, or may be an unlocking window of a screen lock. Only if the authentication of the authentication information such as password, fingerprint etc is passed, the user selected mode may be downward sent to the USB driver so that the USB driver works in this mode. As such, the data read and/or write operation may be performed on the mobile device only after the authentication is passed. If the authentication is not passed, only the charging operating mode is allowed to be started.

Thus, with the method provided by the embodiment of the present disclosure, others cannot directly damage or copy data in the first device in a connection manner such as using a USB data line even if they get hold of the device, as long as the first device is in the locking state and sets the authentication information such as the screen locking password. Thus, the security of the data in the first device is ensured. Since a complex USB synchronization authentication protocol does not need to be developed by synchronization software and the mobile device and the current screen locking function may be utilized, the present disclosure is compatible with various commercially available synchronization software, the implementation method is simple and efficient, and the compatibility is good.

The embodiment of the present disclosure provides a first device having a locking state and a non-locking state. The first device includes a processor configured for: generating an authentication request if a predetermined condition exists between the first device and a second device, when the first device is in a locking state; receiving authentication information, the authentication information being input in response to the authentication request; and authenticating the second device using the authentication information.

The predetermined condition is the first device being connected to the second device; or the predetermined condition is the first device being connected to the second device and the first device receiving a request for data read and/or write from the second device.

The processor is further configured for allowing a data read and/or write operation of the second device on the first device, when the first device receives a request for data read and/or write from the second device after the second device is authenticated.

The locking state includes a state in which the first device executes a command in a first set of commands; the non-locking state includes a state in which the first device executes a command in a second set of commands, wherein the number of commands in the first set of commands is less than that in the second set of commands; when first device is in the locking state, the first device may be switched by the unlocking command in the first set of commands to the non-locking state.

The authentication request is set for the data read and/or write operation of the second device on the first device, or is the unlocking authentication request in the first set of commands.

Others cannot directly damage or copy data in the first device in a connection manner such as using a USB data line even if they get hold of the device, as long as the first device is in the locking state. Thus, the security of the data in the first device is ensured. Since a complex synchronization authentication protocol does not need to be developed by synchronization software and the first device, and the present disclosure is compatible with various commercially available synchronization software, the implementation method is simple and efficient, and the compatibility is good.

Figure 3:
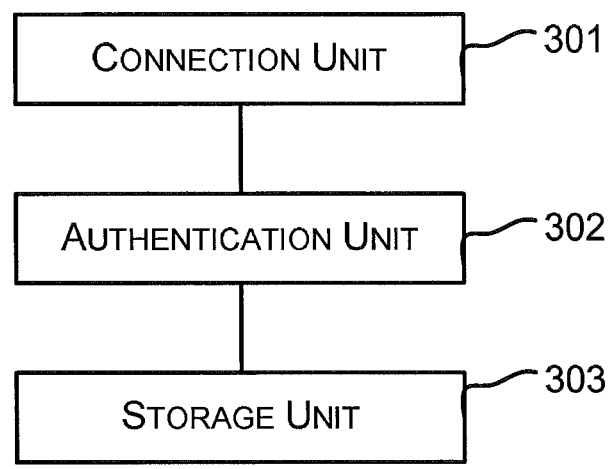
FIG. 3 is an illustrative structure diagram of an electronic device according to an embodiment of the present disclosure.

As shown in FIG. 3, the embodiment of the present disclosure further provides an electronic device having a locking state and a non-locking state. The electronic device may include: a connection unit 301 configured for connecting to another device; an authentication unit 302 configured for generating an authentication request when the electronic device is in the locking state and is connected to the other device via the connection unit, and a predetermined condition is met; receiving authentication information being input in response to the authentication request; and authenticating the other device using the authentication information.

The electronic device may further include: a storage unit 303 configured for storing data, wherein a read and/or write operation of the other device on the data stored in the storage unit is allowed, when the other device is authenticated.

The storage unit may further store the first and the second sets of commands. The locking state is a state in which the electronic device may execute the command in the first set of commands; the non-locking state is a state in which the first device executes the command in the second set of commands, wherein the number of commands in the first set of commands is less than that in the second set of commands; when the first device is in the locking state, the first device is switched to the non-locking state by the unlocking command in the first set of commands. The unlocking command may be invoked after the unlocking authentication is passed.

The electronic device may further include an unlocking authentication unit configured for generating the unlocking authentication request, and receiving the unlocking authentication information. If the unlocking authentication is passed, the unlocking command may be invoked. The unlocking authentication may be authentication of the predetermined string, or the predetermined touch trial, or the predetermined biological characteristic etc.

Regarding the embodiments of the apparatus and the electronic device, the descriptions are relative simple due to the similarity with the method embodiment. The descriptions of the method embodiments may be referred to.

It should be noted that in the present disclosure, terms such as "first", "second" are used for only distinguishing one entity or operation from another entity or operation, but do not require or imply any actual relationship or order among these entities or operations. Furthermore, the terms "include", "comprise" or any of variations intends to cover non-exclusive containing, so that a process, a method, an article or a device including a series of elements not only includes these elements, but also includes other elements not listed explicitly, or further includes inherent elements of the process, the method, the article or the device. In a case that there is no further limitation, the element defined by "comprising one" does not exclude that further same elements may also exist in the process, the method, the article or the device including the element.

It may be understood by the skilled in the art that all or parts of steps in the above method embodiment may be implemented by related hardware instructed by programs. The programs may be stored in a computer readable storage medium such as ROM/RAM, a magnetic disk, an optical disk etc.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

What is claimed is:

1. An authentication method implemented at a first device, wherein the first device is a mobile device connectable with or disconnectable from a second device, the method comprises:
    generating by the first device an authentication request if a predetermined condition exists between the first device and the second device, when the first device is in a locking state, wherein the first device has the locking state and a non-locking state;
    presenting on the first device the authentication request to a user;
    receiving by the first device authentication information, the authentication information being input by the user on the first device in response to the authentication request; and
    authenticating by the first device the second device using the authentication information to determine whether a data read and/or write operation of the second device on the first device is allowed.

2. The method according to claim 1, wherein
    the predetermined condition is the first device being connected to the second device; or
    the predetermined condition is the first device being connected to the second device and the first device receiving a request for data read and/or write from the second device.

3. The method according to claim 1, wherein when the authentication is passed, further comprising:
    the first device receiving a request for data read and/or write from the second device, and allowing a data read and/or write operation of the second device on the first device.

4. The method according to claim 1, wherein when the authentication is not passed, further comprising:
    the first device receiving a request for data read and/or write from the second device, and forbidding a data read and/or write operation of the second device on the first device.

5. The method according to claim 1, wherein
    the locking state comprises a state in which the first device executes a command in a first set of commands;
    the non-locking state comprises a state in which the first device executes a command in a second set of commands, wherein the number of commands in the first set of commands is less than that in the second set of commands;
    the first set of commands comprise an unlocking command which is invoked for switching from the locking state to the non-locking state after an unlocking authentication is passed.

6. The method according to claim 1, wherein
    the authentication request generated by the first device is set for a data read and/or write operation of the second device on the first device, or is an unlocking authentication request.

7. A first device having a locking state and a non-locking state,
    wherein the first device is a mobile device connectable with or disconnectable from a second device,
    the first device comprising a processor configured for:
    generating an authentication request if a predetermined condition exists between the first device and the second device, when the first device is in the locking state;

presenting on the first device the authentication request to a user;

receiving authentication information, the authentication information being input by the user on the first device in response to the authentication request; and authenticating the second device using the authentication information to determine whether a data read and/or write operation of the second device on the first device is allowed.

8. The first device according to claim 7, wherein the predetermined condition is the first device being connected to the second device; or the predetermined condition is the first device being connected to the second device and the first device receiving a request for data read and/or write from the second device.

9. The first device according to claim 7, wherein the processor is further configured for allowing a data read and/or write operation of the second device on the first device, when the first device receives a request for data read and/or write from the second device after the second device is authenticated.

10. The first device according to claim 7, wherein the locking state comprises a state in which the first device executes a command in a first set of commands;

the non-locking state comprises a state in which the first device executes a command in a second set of commands, wherein the number of commands in the first set of commands is less than that in the second set of commands;

the first set of commands comprise an unlocking command which is invoked for switching from the locking state to the non-locking state after an unlocking authentication is passed.

11. The first device according to claim 7, wherein the authentication request is set for a data read and/or write operation of the second device on the first device, or is an unlocking authentication request.

12. An electronic device having a locking state and a non-locking state, comprising:

a connection unit configured for connecting to another device, wherein the electronic device is a mobile device connectable with or disconnectable from the other device;

an authentication unit configured for generating an authentication request when the electronic device is in the locking state and is connected to the other device via the connection unit, and a predetermined condition is met; presenting on the electronic device the authentication request to a user; receiving authentication information being input by a user on the electronic device in response to the authentication request; and authenticating the other device using the authentication information to determine whether a data read and/or write operation of the other device on the first device is allowed.

13. The electronic device according to claim 12, further comprising:

a storage unit configured for storing data;

wherein a read and/or write operation of the other device on the data stored in the storage unit is allowed, when the other device is authenticated.

\* \* \* \* \*